Figure 1:
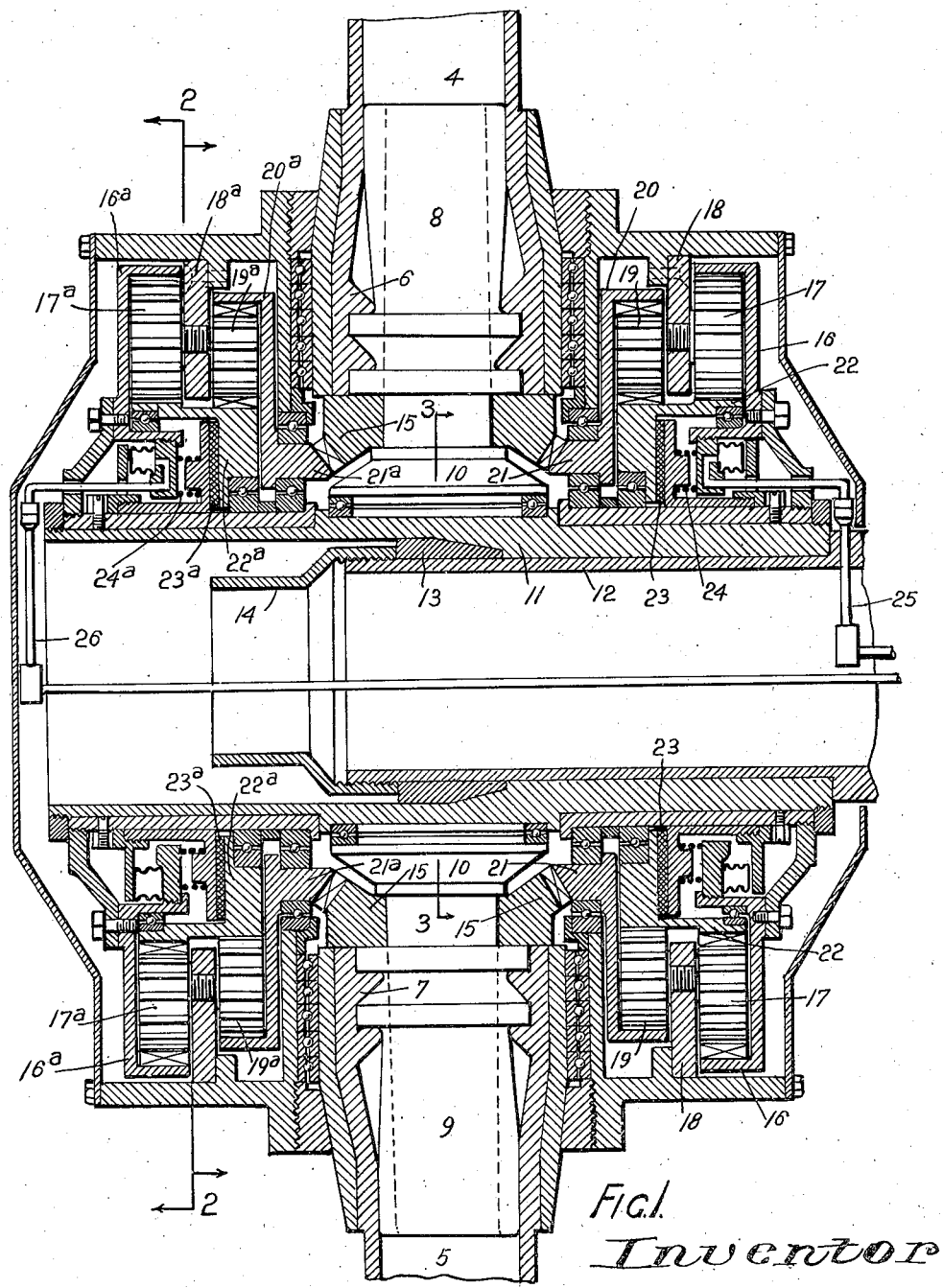

Patented Aug. 30, 1949

2,480,468

UNITED STATES PATENT OFFICE 2,480,468

VARIABLE PITCH AND REVERSIBLE PITCH PROPELLER

Frederick Douglas Hoinville, Rose Bay, near Sydney, New South Wales, Australia

Application September 30, 1946, Serial No. 700,280
In Australia October 9, 1945

2 Claims. (Cl. 170—160.28)

This invention relates to an infinitely variable pitch and reversible pitch airscrew.

Existing airscrews of this type, for example those in the 2,000 H. P. field have a rate of pitch change of 10 degrees or less per second using 20 H. P. from an electric motor geared at 15,000 to 1 or using hydraulic pressure on a piston attached to the blades. At least eight seconds are required to reverse such an airscrew and this period of time is equal to almost 1200 feet of travel at 100 M. P. H. Therefore an aircraft landing at this speed will travel almost 1200 feet before airscrew braking can be applied or if the aircraft is compelled to take off again after the airscrew has been reversed such a period of time must elapse before forward traction can be resumed.

By this invention the rate of pitch change is materially increased. While the invention is not confined thereto present indications are that it will achieve a rate of pitch change for an airscrew in the mentioned H. P. field in excess of 45 degrees per second. With such a rate of change the invention makes it possible for an aircraft to obtain a reversal of its airscrew in 300 feet or less travel thereby greatly increasing the margin of safety.

Other advantages arising out of this invention are: (1) No large auxiliary power required to operate pitch change; (2) momentary application of practically the whole engine power to pitch changing; (3) sensitive control for constant speed operation; (4) elimination of multiple pumps or motors; (5) automatic locking of pitch if hydraulic system fails—no tendency to creep either way in such case; and (6) very simple and rapid change back to forward thrust in emergency.

The method of the invention consists in applying the whole or substantially the whole of the engine torque to turn the airscrew blades about their own axes. During the change of pitch movement the torque normally applied to rotating the airscrew is applied as stated to the turning of the airscrew blades about their axes. Consequently the airscrew becomes, during the pitch changing operation, substantially free on the airscrew shaft and is not subject, as far as tractive effort is concerned, to the power of the engine.

Broadly the means consist of pitch changing gears which are arranged in the form of a differential assembly comprising two opposed bevel gears (slip gears) mounted on the airscrew shaft and meshing with opposite sides of airscrew blade root bevel gears. Each slip gear is adapted to be locked on the airscrew shaft by a self locking brake or clutch which is mounted on or connected to the airscrew shaft. Each such clutch controls its associated slip gear through suitable means such as a train of reduction gears whereby the slip gear may be locked or slipped as required by locking or releasing the clutch. The airscrew hub housing is free to rotate on the airscrew shaft. When both slip gears are locked engine torque is transmitted equally by them to the respective sides of the blade root gear with which they are engaged thus ensuring that the airscrew revolves with the airscrew shaft, the blades being locked at the pitch angle selected. When it is desired to alter pitch, the clutch on the appropriate slip gear is released allowing engine torque to be transmitted only by the opposite slip gear which remains locked and thereby transmits torque to its side only of each blade root gear thus imparting a powerful and rapid turning movement to each blade to cause it to revolve about its own axis and change pitch. The released slip gear will of course, revolve freely on the airscrew shaft. By releasing one slip gear the engine torque forces the blade into coarse pitch or feathering position. By releasing the opposite slip gear the blades are forced into fine or reverse pitch. When the required pitch has been attained the blades are re-locked at that point by re-applying the clutch to the released slip gear.

To maintain constant speed in forward pitch an engine driven governor which may be of any appropriate known type, controls the clutch releasing mechanism through appropriate means using known type movements which may be hydraulic, electrical or mechanical in character. This allows the pitch to become infinitely coarser or finer as the engine speed rises or falls. To reverse pitch a suitable control is employed which for example, may be a change-over device disposed between the governor and the clutches to cause the governor to operate the clutch releasing apparatus opposite to that which it operates when in forward pitch. This gives constant speed control in reverse pitch. Stops are provided to limit the blade pitch range from full forward feather to full reverse feather and/or from fine forward pitch through forward range and feather position and reverse range to fine reverse pitch.

Figure 2:
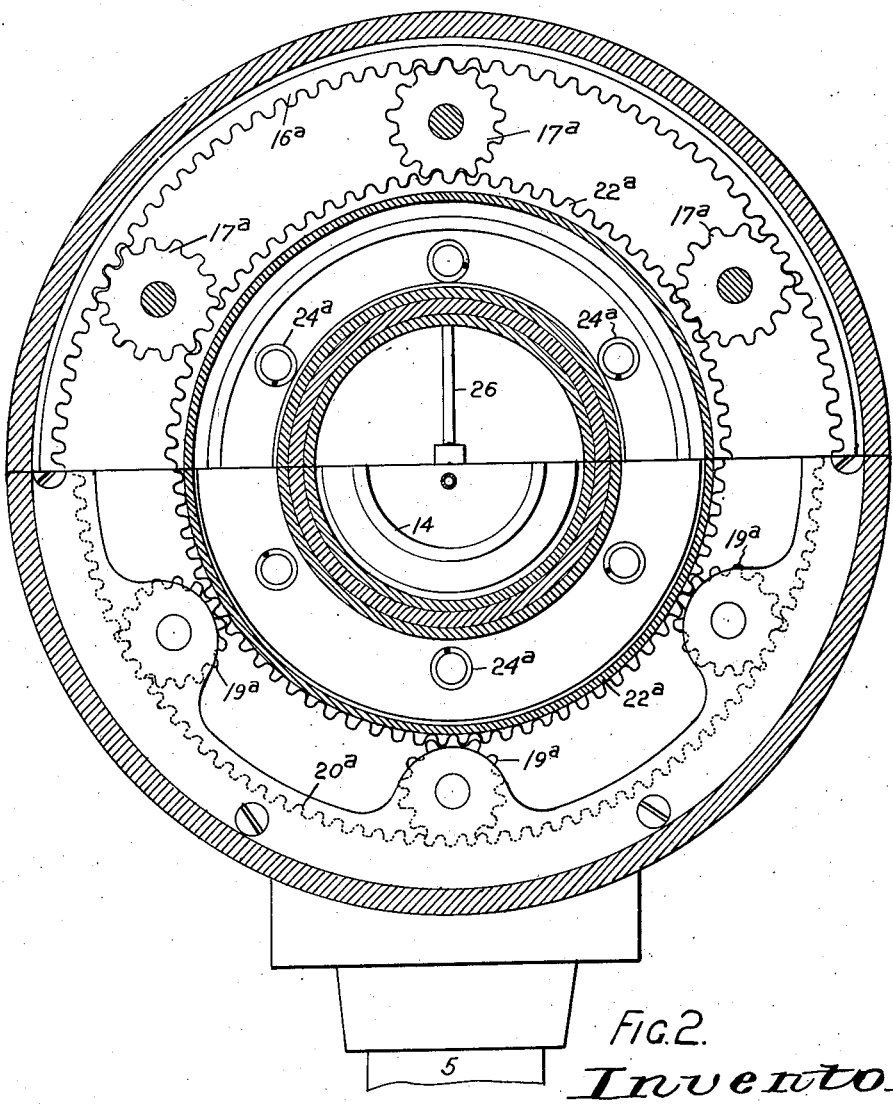
Figure 3:
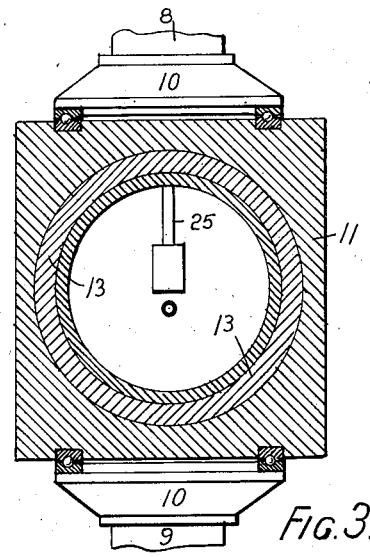
Figure 4:
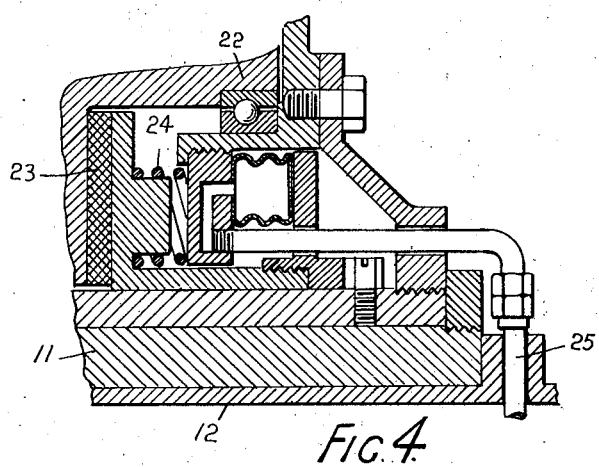

One embodiment of the invention applied by way of example to a two blade airscrew is illustrated in the annexed drawings wherein Fig. 1 is a longitudinal central section through the airscrew blades mounting; Fig. 2 is a section on line 2—2 of Fig. 1; Fig. 3 is a section on line 3—3 of Fig. 1; Fig. 4 is a detail section of the clutch.

In this embodiment two airscrew blades 4 and 5 (a fragment of the blades only is shown) each have their roots 6 and 7 mounted on radial arms 8 and 9 and these radial arms are attached to or form part of hub 10. The mounting of the airscrew blades is such that said blades can be rotated on their axes over the stated forward and reverse pitch range. The hub 10 is free to rotate on sleeve 11. This sleeve 11 is splined to the airscrew shaft 12 and it is retained on said shaft 12 by a ring 13 and a lock nut 14 or other devices known in the art. The airscrew blade roots 6 and 7 each have a pitch changing bevel gear 15 affixed thereto.

At each end of the sleeve 11 and splined to it is an annular or ring gear 16—16a which drives a plurality of planet pinions 17—17a mounted on a carrier 18—18a. This carrier also mounts on its opposite side a further set of planet pinions 19—19a which drive an annular or ring gear 20—20a. This annular or ring gear 20—20a incorporates a bevel gear 21—21a which is in engagement with pitch changing bevel gear 15. Each set of planet pinions 17—17a—19—19a engage a sun gear wheel 22—22a. Sun gear wheel 22—22a is normally locked with the ring gear 20—20a by means of a clutch member 23—23a held in engagement by a plurality of springs 24—24a.

The assembly described in this embodiment constitutes two double epi-cyclic gear trains, one at each end of the sleeve 11, which are locked in engagement with the pitch changing bevel gear 15 by the clutch members 23—23a and prevents said pitch changing bevel gear rotating about its axis. When both double epi-cyclic gear trains are locked engine torque is transmitted through them and through the pitch changing bevel gear 15 to the airscrew. The airscrew thrust is taken by the radial arms 8—9 and the hub 10.

It will be appreciated that while each airscrew blade has its own pitch changing bevel gear 15 the double epi-cyclic gears described above are common to all the blades of an airscrew.

Pitch changing of the airscrew blades is achieved by releasing the clutch 23 or 23a on one gear train or the other according to the required direction of change.

The clutch is released by reducing or removing pressure of the springs 23 or 24a. In the embodiment illustrated hydraulic pressure transmitted through the pipe 25 or 26 as the case may be is employed, for example in the manner presently employed for hydraulic pitch changing gears. Any form of clutch and clutch release mechanism may be employed. When a clutch is released it permits the double epi-cyclic gear train controlled thereby to rotate freely; consequently the engine torque then transmitted wholly by the opposite double epi-cyclic gear train will cause the airscrew blades to rotate about their axes. The epicyclic gear train can be designed to give a considerable say 500:1 reduction between the sun gear and the airscrew shaft. The clutch is then required to develop a fraction, say 1/500th of the engine torque, and thus can be of quite small proportions. As the speeds of rotation of the various parts are moderate the inertia of the system can be kept reasonably low permitting rapid pitch changing. At the same time the movements are adequate to give satisfactory control for governing.

Clutch governing devices may be employed to automatically control the pitch of the airscrew blades.

For feathering an auxiliary source of pressure would be required, such as a hydraulic accumulator or electric pump.

In normal flight the governor would give constant speed control by diverting hydraulic pressure to the front clutch to increase pitch, or to the rear clutch to decrease pitch.

Reversing would be done by operating the pitch change control which would cross the hydraulic liquid feed lines from the governor to the airscrew, and opening the throttle. This would cause the airscrew blades to slip rapidly into coarse reverse pitch and the governor would then bring the engine to constant speed by automatically adjusting the degree of reverse pitch.

To revert to forward thrust it would only be necessary to replace the reversing control to its original position, keeping throttle open.

*To feather.*—With engine power available this would be simply a matter of allowing the front clutch to slip until the feather stop was reached. But since it must be taken for granted that feathering will be done with the engine dead, the method of control would be to use a feathering lever which would simultaneously cut off the governor control and apply pressure to the rear clutch release. This would allow the windmilling action and momentum of the airscrew to turn the blades through coarse forward pitch to the feather stop position.

Unfeathering could be done in two ways, namely, (1) if the engine is restarted or turned by any auxiliary means, the governor would automatically re-set the pitch by slipping the rear clutch; (2) if it is desired to unfeather without first turning the engine, it will be necessary to retain a very slight degree of forward pitch—perhaps only one degree at feathering position. Releasing the front clutch would then allow the airscrew to windmill slightly and turn the blades into coarse pitch, where it would be necessary to re-lock the clutch until the governor was ready to take over.

It will be obvious that a variety of other and alternative methods are available for carrying the invention into effect. For instance, the engine torque may be applied to control the pitch changing gears through, say, two electro-motors each fitted with an electro-magnetic clutch arranged, when an electro-motor is switched off, to lock its associated pitch changing gearing and when switched on to release the lock. Electro-motors, as aforesaid, will be located appropriately to the shaft. It will be seen that the electro-magnetic clutch is an equivalent for the hydraulic clutch referred to above.

In one form of hydraulically operated mechanism the clutch device may include hydraulic pistons located, say, within the end of the airscrew shaft and having helical or wave form slots which engage teeth or pegs attached to each slip gear. On release of the selected piston under hydraulic influence the teeth or pegs are disengaged from the associated slip gear and slide in the slots causing such gear to slip and producing the operation previously generally described, while the piston reciprocates freely in its cylinder.

In a simplified though less efficient form of the invention employing a single slip gear, the opposed gear is permanently locked. This type uses engine torque to increase pitch, and airscrew momentum (with engine power shut off)

to decrease or reverse pitch. In one such form of the invention applicable to light aircraft, a number of set airscrew positions say feather, course pitch, fine pitch and reverse, are provided, a selector device being employed to engage the airscrew in the desired position through appropriate clutch means. Splined to the airscrew shaft is a pair of concentrically arranged spring loaded dog clutch members which respectively engage, through slip units, a peg attached to each side of the airscrew blade root. A pitch range selector, in the form of a collar surrounding the clutch members is provided with a stepped slot whereby, when a clutch is disengaged, a selected pitch position is secured by the movement of a stop device into the appropriate step of the slot. This stop device projects through the stepped slot and is a pitch range stop. When both clutches are engaged the slip units are locked and engine torque is applied to both sides of each blade root so that the airscrew rotates with fixed pitch. To alter pitch the appropriate clutch is released by a manually operated spring loaded yoke and an automatic switch which momentarily interrupts the ignition to free the clutch from engine torque; if this were not done engine torque would cause the clutch to bind on splines. (Engine torque must be positive during all pitch changes except feathering and unfeathering in this form of the invention.) When the clutch is released its associated slip unit is freed and slips until the pitch range stop abuts the step of that position of the stepped slot in which it is moving, after which the clutch is re-engaged.

If the second clutch is released the action is reversed and the airscrew returns to its former position. By manipulating the selector, the stop is moved to the appropriate step of the stepped slot and release of the appropriate clutch allows a desired pitch setting to be made within the range provided. In certain positions airscrew overrun, when the engine is switched off, causes the blades to move to the required position. In other positions, use is made of airscrew windmilling action.

It is not necessary to state that usually although not always, control levers or their equivalent are necessary for the manipulation of the apparatus herein referred to. Control levers should be provided for forward and reverse control and also for feather and unfeather control and such levers will have a neutral setting. When both control levers are in the neutral setting the airscrew pitch will be locked. The forward and reverse control lever may be combined with the throttle lever retaining the fore and aft movement for throttle control and having a sideways movement, for pitch control; in this way the pilot can operate both controls with one manual movement.

If desired a suitable indicator may be installed say on the instrument panel, to give the pilot a visual indication of the condition of the airscrew or airscrews at any particular time.

The foregoing is by way of example only, and it is to be understood that equivalents for the mechanical movements designated in the specification are within the scope and ambit of the invention.

I claim:

1. In a variable pitch and reversible pitch airscrew, an engine shaft, a sleeve fixed to said shaft, a hub rotatable on the sleeve, arms on said hub, blades mounted for rotation about their axes on said arms, a gear on the root of each blade, two differential gear trains including two gears meshing with said root gears at opposite points, two self locking clutches, each of said differential gear trains being connected through one of said self locking clutches to the engine shaft, means to release each of said clutches independently.

2. In a variable pitch and reversible pitch airscrew, an engine shaft, a sleeve fixed to said shaft, a hub rotatable on the sleeve, arms on said hub, blades mounted for rotation about their axes on said arms, a bevel gear on the root of each blade, a ring gear on each end of said sleeve common to all the blades, a set of planet pinions engaging each ring gear, a carrier supporting each set of planet pinions at one side thereof, a second set of planet pinions on the opposite side of each carrier, a second ring gear common to all the blades and engaged by the second set of planet pinions, said second ring gear including a bevel gear engaging the bevel gear on the root of each blade, sun wheels common to all the blades and each engaged by one each of the pinions of the first and second mentioned sets, a clutch to normally lock each sun wheel with the related second ring gear, and means to actuate the clutches at each end of the sleeve independently.

FREDERICK DOUGLAS HOINVILLE.

REFERENCES CITED

The following references are of record in the file of this patent:

UNITED STATES PATENTS

| Number | Name | Date |
|---|---|---|
| 1,719,953 | Wiegand | July 9, 1929 |
| 1,765,091 | Morris | June 17, 1930 |
| 1,833,843 | Leparmentier | Nov. 24, 1931 |
| 2,156,102 | Austin | Apr. 25, 1939 |
| 2,177,315 | De Caria | Oct. 24, 1939 |
| 2,250,694 | Algarsson | July 29, 1941 |
| 2,276,347 | Ruths et al. | Mar. 17, 1942 |
| 2,316,438 | Lea | Apr. 13, 1943 |

FOREIGN PATENTS

| Number | Country | Date |
|---|---|---|
| 508,366 | Great Britain | June 26, 1939 |